Feb. 12, 1929.  
G. F. BOSCH  
1,702,194  
AIRCRAFT REFRIGERATOR  
Filed Aug. 10, 1928   2 Sheets-Sheet 1

GEORGE F. BOSCH, INVENTOR

BY Victor J. Evans, ATTORNEY.

WITNESS:

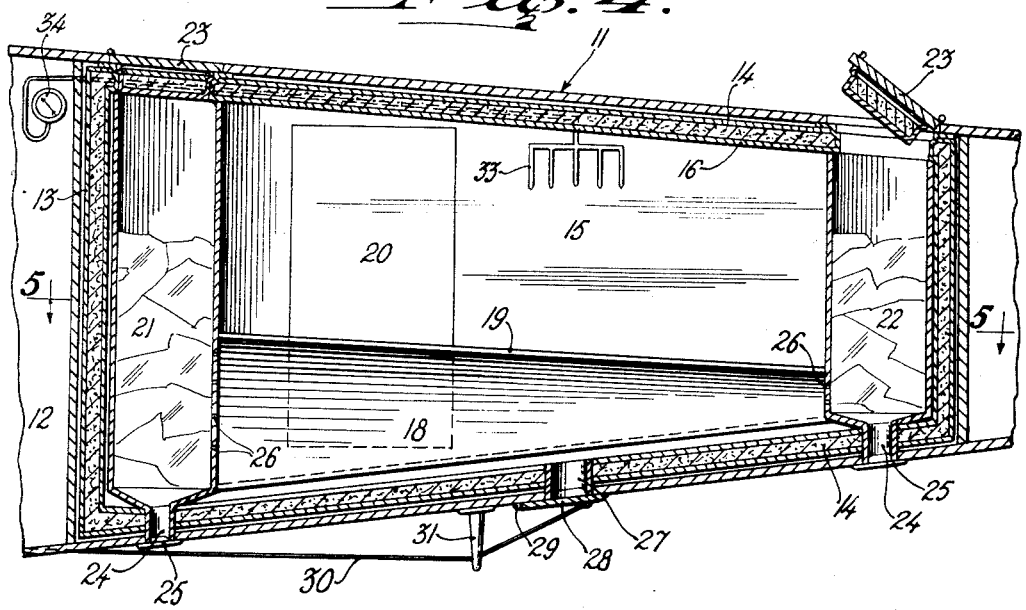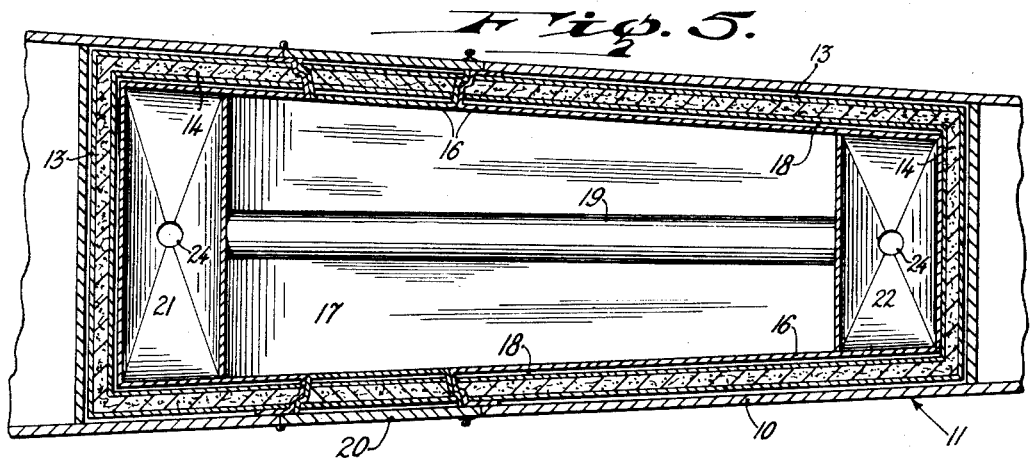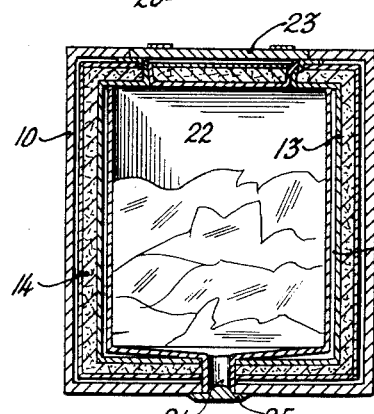

Patented Feb. 12, 1929.

1,702,194

UNITED STATES PATENT OFFICE.

GEORGE F. BOSCH, OF MOUNT VERNON, NEW YORK.

AIRCRAFT REFRIGERATOR.

Application filed August 10, 1928. Serial No. 298,774.

This invention relates to improvements in refrigerators and particularly to refrigerators for aircraft.

The primary object of the invention resides in a refrigerator built into the fuselage of an airplane for the rapid transportation of fresh edibles, furs, and the like, for preserving them during flight from one distant point to another, thus bringing the markets for such articles into closer touch with the sources of production.

Another object of the invention is to provide a refrigerator aircraft which includes a cold storage compartment with ice chambers at opposite ends thereof, and a water cooling jacket surrounding the cold storage compartment for receiving the melted water from the ice placed in the ice chambers, and which acts to chill the walls of the storage compartment.

A further object is the provision of a valve means operable from the control seat of the aircraft for draining part or all of the water from the water jacket in the event that the weight of the same should interfere with the proper balance of the aircraft in flight.

With these and other objects in view, the invention resides in certain novel construction and combination and arrangement of parts, the essential features of which are hereinafter fully described are particularly pointed out in the appended claim, and are illustrated in the accompanying drawing, in which:—

Figure 4 is an enlarged vertical longitudinal sectional view on the line 4—4 of Figure 2.

Figure 5 is a horizontal sectional view on the line 5—5 of Figure 4.

Figure 6 is a vertical transverse sectional view on the line 6—6 of Figure 1.

Figure 1:
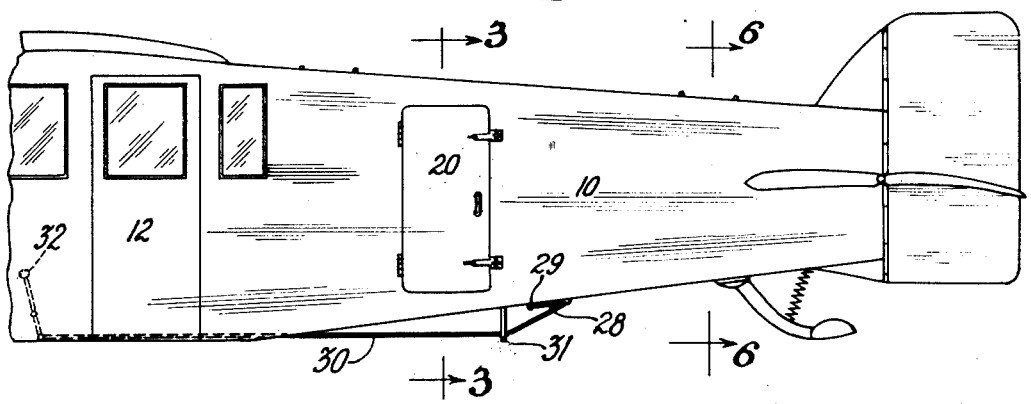
Figure 1 is a fragmentary side elevation of an airplane equipped with my improved refrigerator.
Figure 2:
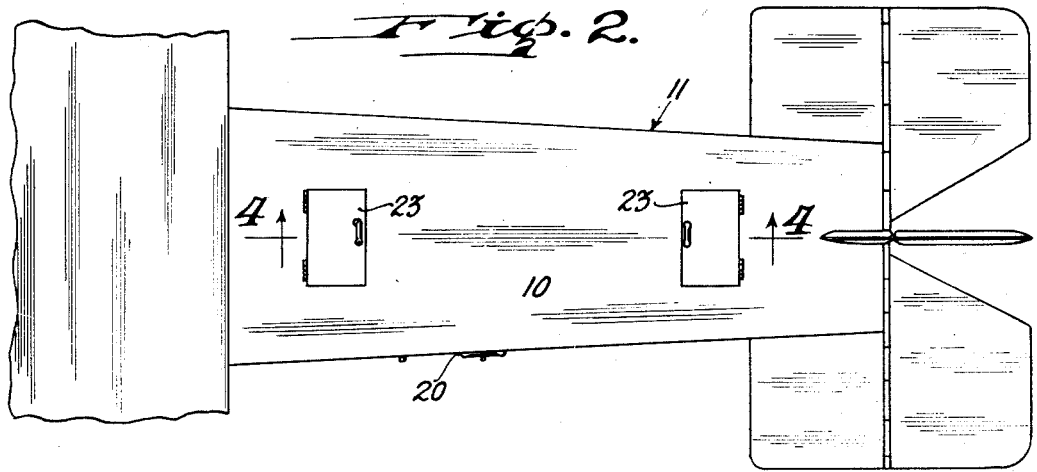
Figure 2 is a top plan view thereof.
Figure 3:
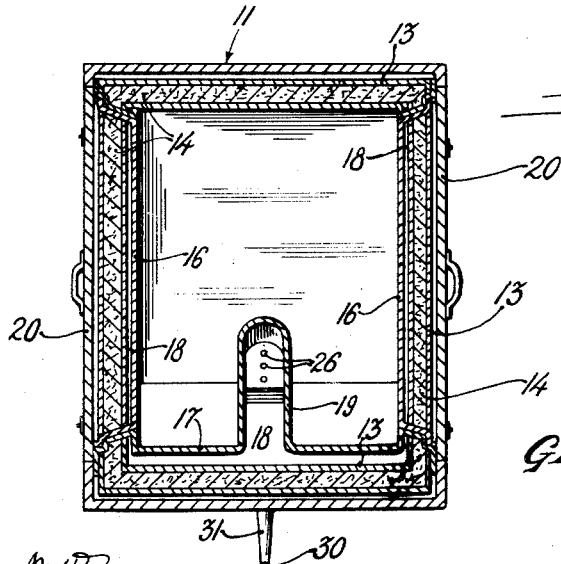
Figure 3 is a vertical transverse sectional view on the line 3—3 of Figure 1.

Referring to the drawings by reference characters, the numeral 10 designates the tail end of an airplane which includes a fuselage 11 having a cabin or operator's control compartment 12, behind which my improved refrigerator 13 is built in.

The walls of the refrigerator are suitably insulated as at 14 and should be of such material as to be moisture proof, vermin proof, and should have poor conducting power at low temperatures to exclude heat from within the refrigerator.

The refrigerator includes a storage compartment 15, the opposite side walls 16 and the bottom wall 17 are spaced from the insulating walls to provide a water space or jacket 18. The bottom wall 17 is provided with a central longitudinal inverted U shape trough 19, the top of which is disposed parallel to the top wall of the storage compartment. Swinging doors 20 are provided in opposed side walls of the storage compartment for access thereto in the storing and removal of articles therefrom.

Mounted within the insulated walls at opposite ends of the storage compartment are front and rear ice chambers or chests 21 and 22 accessible through doors 23 in the top wall, and drainable through outlets 24 in the bottom wall, which outlets are normally closed by removable plugs 25. The inner walls of the ice chambers below the level of the top of the trough 19 are provided with openings 26 which open into the trough to drain ice water from the chambers into the water cooling jacket.

From the description thus far, it will be seen that ice may be placed into the respective ice chambers upon opening of the doors 23, which ice acts upon the end walls of the storage compartment to chill the air therein. The melted water from the ice drains through the opening 26 into the trough 19 and tends to fill up the water cooling jacket 18 which ice water acts upon the side and bottom walls of the storage compartment to chill the air therein. The ice in the ice chambers acts directly upon the end walls of the storage compartment and also aids in the chilling of the interior thereof. It will therefore be manifested that the interior of the storage compartment may be effectively cooled and any perishable foods placed therein for shipment will be kept fresh.

Should it be desired at any time while the aircraft is in flight to drain any excess water from the water cooling chamber to relieve the aircraft of the weight of the same, I provide a water drain outlet 27 in the bottom of the water jacket which opens on to the underside of the fuselage. A flat valve member 28 is mounted on the underside of the fuselage by a spring hinge 29 which tends to normally hold the same in a closed position over the outlet 27. The actuating cable 30 has one of its ends fixedly connected to the valve member while its other end passes through a guide 31 and is led to the control cabin 12 where it is connected to a pivoted actuating lever 32. By pulling backward upon the lever 32 an operator may cause the valve member to open against the action of its spring hinge to drain the entire contents of the water jacket or any part thereof. The spring hinge returns the valve member to closed position upon release of the lever and seals the outlet against leakage.

For visibly indicating to the responsible person in the cabin 12 the amount of moisture in the air within the storage compartment, I provide a hygrometer 33 which is suspended therein and is operatively connected with an indicating gauge 34 mounted within the cabin. Frequent reading of the gauge may be taken to prevent too much or too little moisture in the cool air within the storage compartment, as the preservation of the food stuffs stored therein is dependent upon the right amount of moisture to prevent spoiling. An accurate checkup should be made of the temperature of the storage compartment before and during flight of the aircraft, and if desired a thermometer may be suitably connected with the storage compartment and readable in the cabin 12. Care should also be taken to ventilate the storage compartment before and after delivery to insure the freshness of the air therein and which can be accomplished by the opening of the doors 20.

It is believed that the many possibilities of my refrigerator aircraft will be appreciated as it will be found most practical in the rapid transporting of food stuffs, furs and the like which must be kept in cold storage during shipment, thus bringing the world's market closer to the sources of production. Such an aircraft will also be found useful in emergency relief work where it is necessary to transport fresh foods to remote parts not capable of being reached in the other types of carriers.

What is claimed as new is:—

In a refrigerator built into the fuselage of aircrafts, a cold air storage compartment, doors therein for access thereto, ice water jackets partially surrounding said storage compartment, ice chambers for the storage of ice therein and having communication with said water jackets to allow melted water from the ice to enter said water jackets, and doors for gaining access to said ice chambers.

In testimony whereof I affix my signature.

GEORGE F. BOSCH.